(12) United States Patent
Shivpuri

(10) Patent No.: US 10,363,599 B2
(45) Date of Patent: Jul. 30, 2019

(54) HOT FORMING OF COOLING GALLERIES IN STEEL PISTONS

(71) Applicant: Ohio State Innovation Foundation, Columbus, OH (US)

(72) Inventor: Rajiv Shivpuri, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 16/203,789

(22) Filed: Nov. 29, 2018

(65) Prior Publication Data

US 2019/0091757 A1   Mar. 28, 2019

Related U.S. Application Data

(60) Division of application No. 15/426,724, filed on Feb. 7, 2017, now Pat. No. 10,144,052, which is a continuation of application No. PCT/US2016/030351, filed on May 2, 2016.

(60) Provisional application No. 62/155,688, filed on May 1, 2015.

(51) Int. Cl.
| | |
|---|---|
| *B21K 1/18* | (2006.01) |
| *B23P 15/10* | (2006.01) |
| *F02F 3/18* | (2006.01) |
| *F02F 3/22* | (2006.01) |

(52) U.S. Cl.
CPC ............. *B21K 1/185* (2013.01); *B23P 15/10* (2013.01); *F02F 3/18* (2013.01); *F02F 3/22* (2013.01); *F02F 2200/04* (2013.01)

(58) Field of Classification Search
CPC .. B21K 1/185; B23P 15/10; F02F 3/18; F02F 3/22; F02F 2200/04
See application file for complete search history.

(56) References Cited

U.S. PATENT DOCUMENTS

| | | | |
|---|---|---|---|
| 3,341,924 | A | 9/1967 | Clary et al. |
| 4,294,101 | A | 10/1981 | Diemer et al. |
| 4,662,047 | A | 5/1987 | Berchem |
| 6,491,013 | B1 | 12/2002 | Gaiser et al. |
| 7,104,183 | B2 | 9/2006 | Huang |
| 7,421,782 | B2 | 9/2008 | Otaka |
| 7,761,987 | B2 | 7/2010 | Mielke |
| 8,082,839 | B2 | 12/2011 | Huang |
| 8,286,852 | B2 | 10/2012 | Kolbe et al. |
| 9,216,474 | B2 | 12/2015 | Wandrie, III et al. |
| 2009/0013531 | A1 | 1/2009 | Heraldo et al. |

(Continued)

FOREIGN PATENT DOCUMENTS

| | | |
|---|---|---|
| DE | 102007027337 A1 | 12/2008 |
| EP | 1640086 A1 | 3/2006 |
| IE | 102005021428 A1 | 11/2006 |

OTHER PUBLICATIONS

Machine Translation of Kolbenschmidt; DE102007027337A1; Dec. 2008 (Year: 2008).*

*Primary Examiner* — Ryan J. Walters
(74) *Attorney, Agent, or Firm* — Standley Law Group LLP

(57) ABSTRACT

A piston, particularly a piston for use in a diesel engine, particularly a heavy duty diesel engine, is formed from a billet of metal, such that the finished piston has a mass that is at least 50%, and, more preferably, up to about 62%, of the mass of the billet. Other than finishing steps, the piston is formed with a closed gallery, without loss of mass through machining processes.

11 Claims, 5 Drawing Sheets

(56) References Cited

U.S. PATENT DOCUMENTS

2013/0133610 A1 5/2013 Gniesmer
2013/0146017 A1 6/2013 Muscas et al.
2015/0107106 A1 4/2015 Buschbeck et al.

* cited by examiner

HOT FORMING OF COOLING GALLERIES IN STEEL PISTONS

CROSS-REFERENCE TO RELATED APPLICATIONS

This application is a divisional of U.S. application Ser. No. 15/426,724, filed 7 Feb. 2017 and now issued as U.S. Pat. No. 10,144,052, which is a bypass continuation of PCT application PCT/US2016/030351, filed on 2 May 2016, which is, in turn, a non-provisional of U.S. provisional patent application 62/155,688, filed on 1 May 2015. All of these applications are incorporated by reference as if fully recited herein.

TECHNICAL FIELD

The disclosed embodiments of the present invention relate to a piston, especially a steel piston that would be used in an engine, especially a diesel engine. Other aspects of the present invention encompass the manufacture of a piston for use in other internal combustion engines in which the fuel comprises petroleum gas, natural gas and hybrid fuels. These latter aspects will include pistons from non-ferrous metals, especially including aluminum. Such a piston will be manufactured to have thin-walls and cavities, while retaining structural integrity for the pressures and temperatures encountered in the intended use. Other embodiments of the present invention are directed at methods of manufacturing a piston having the requisite properties.

BACKGROUND OF THE ART

In the design of internal combustion engine components, especially for diesel engines, there is a requirement to increase power density, higher compression ratios, increased fuel injection pressures, exhaust gas recirculation and after-treatment of exhaust gases. Each of these places high mechanical and thermal loads on the pistons of the engines. For example, a steel piston in a diesel engine will be exposed to more than 200 bar of pressure and temperatures in the range of about 600° C. in the combustion chamber, accompanied by high temperature gradients and high inertial forces due to high reciprocating speeds. These demands are accompanied by a requirement to not increase, but, indeed, to reduce the mass of the piston.

One feature of the piston structure known in the art, as illustrated, for example, by U.S. Pat. No. 6,491,013, to Gaiser and assigned to Federal Mogul, is a gallery beneath the top wall of the piston body and radially inward from the ring belt. While many references, including Gaiser '013, refer to this gallery as being "closed," the need to allow circulation of cooling fluid mandates that there are openings to let the fluid in and out of the gallery, so it is not actually closed, but that terminology will be used here, as it is in the prior art. As described by Gaiser '013, it is conventional to form the piston body with the closed gallery from a top part and a bottom part, which are then joined together by a technique such as friction welding. The respective parts are preferably investment castings, but they may be forged from a casting as a monobloc structure with an internal recess for receiving a connecting rod. The piston will also conventionally have a bowl crown formed at the top of the piston body to reduce thermal loads and lighten the overall mass.

In recent years, a trend has been to move to aluminum pistons for use in gasoline internal combustion engines for automobiles, but steel is still clearly preferred for diesel pistons, as it has higher strength at higher operating temperatures. For definitional purposes, this specification will refer to the pistons as being used for heavy-duty engines (or HDEs), which will be further classified as either "medium HDEs" or "heavy HDEs." The distinction, as set by the US Environmental Protection Agency, is that HDEs have a power range of 200 to greater than 3500 horsepower, but that medium HDEs are in the weight range of 19501 to 33000 pounds, while heavy HDEs are heavier than 33000 pounds.

To properly form the cooling gallery, the manufacturing sequence used includes at least forging, machining, welding and heat treatment. An exemplary embodiment of such techniques is provided by U.S. Pat. No. 8,286,852 to Kolbe and assigned to Gesenkschmiede Schneider GmbH. In that patent, a head member and a skirt member are separately forged. Each member provides an open portion of a cooling gallery. By setting up a pair of unsymmetrical contact surfaces on the respective parts, a welding bead formed by friction welding is located predominantly outside of the cooling gallery produced by the friction welding.

An even more-recent patent, U.S. Pat. No. 9,216,474, to Wandrie and assigned to Industrial Parts Depot, Torrance, Calif., continues to use a friction welding technique of a pair of separately formed parts to provide the closed gallery.

It is therefore an unmet advantage of the prior art to provide a new and non-obvious method of combining technologies in a hybrid manner to manufacture heavy duty steel pistons with a cooling gallery.

SUMMARY OF THE INVENTION

This and other unmet advantages are provided by a method for forming a piston having a closed gallery. Such a method comprises the steps of:
  providing a billet of metal;
  hot forging the billet, producing a piston preform;
    hot forming the piston preform to generate a piston preform having a flange and an undercut, separated axially by a gallery that is open in the radial direction, the gallery being opened up on the preform without any loss of material;
    hot bending the flange over the open gallery, generating a piston preform having a closed gallery; and
    machining the piston preform having a closed gallery, generating a finished piston.

In some of the embodiments, the hot forging step includes forming a skirt, a piston pin boss and a crown in the piston preform.

In some of these same embodiments, the hot forming step includes selectively heating the crown and spin-forming it to generate the flange and the undercut that are separated axially by the radially-open gallery.

In other embodiments, the hot forging step includes forming a conical spike atop an underskirt in the piston preform.

In these other embodiments, the hot forming step includes selectively heating the conical spike and upsetting it on a set of horizontal split dies, forming the flange, the open gallery and the undercut.

In some embodiments, the machining step includes forming at least a ring belt.

In any of the embodiments, the finished piston produced has a weight that is at least 50% of the weight of the billet provided.

In many of these embodiments, the billet provided is cylindrical. When the billet provided is cylindrical, up to about 62% of the mass of the cylindrical billet is retained in the finished piston.

In most of the embodiments, substantially all of the loss of mass between the cylindrical billet provided and the finished piston occurs during the step of machining to obtain the finished piston.

In most of the embodiments, the billet provided comprises a steel alloy.

In most of the embodiments, at least one of the steps of hot forging, hot forming and hot bending includes induction heating to establish a temperature gradient. In some of these, all heating required in the steps of hot forging, hot forming and hot bending are achieved using induction heating.

In many of the embodiments, all of the steps involved in converting the billet provided into a piston preform having a closed gallery are achieved without using any machining of the billet or any intermediate preforms.

Some of the objects of the invention are achieved by a piston with a closed gallery, produced by a method according to any of the method claims.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Figure 1:
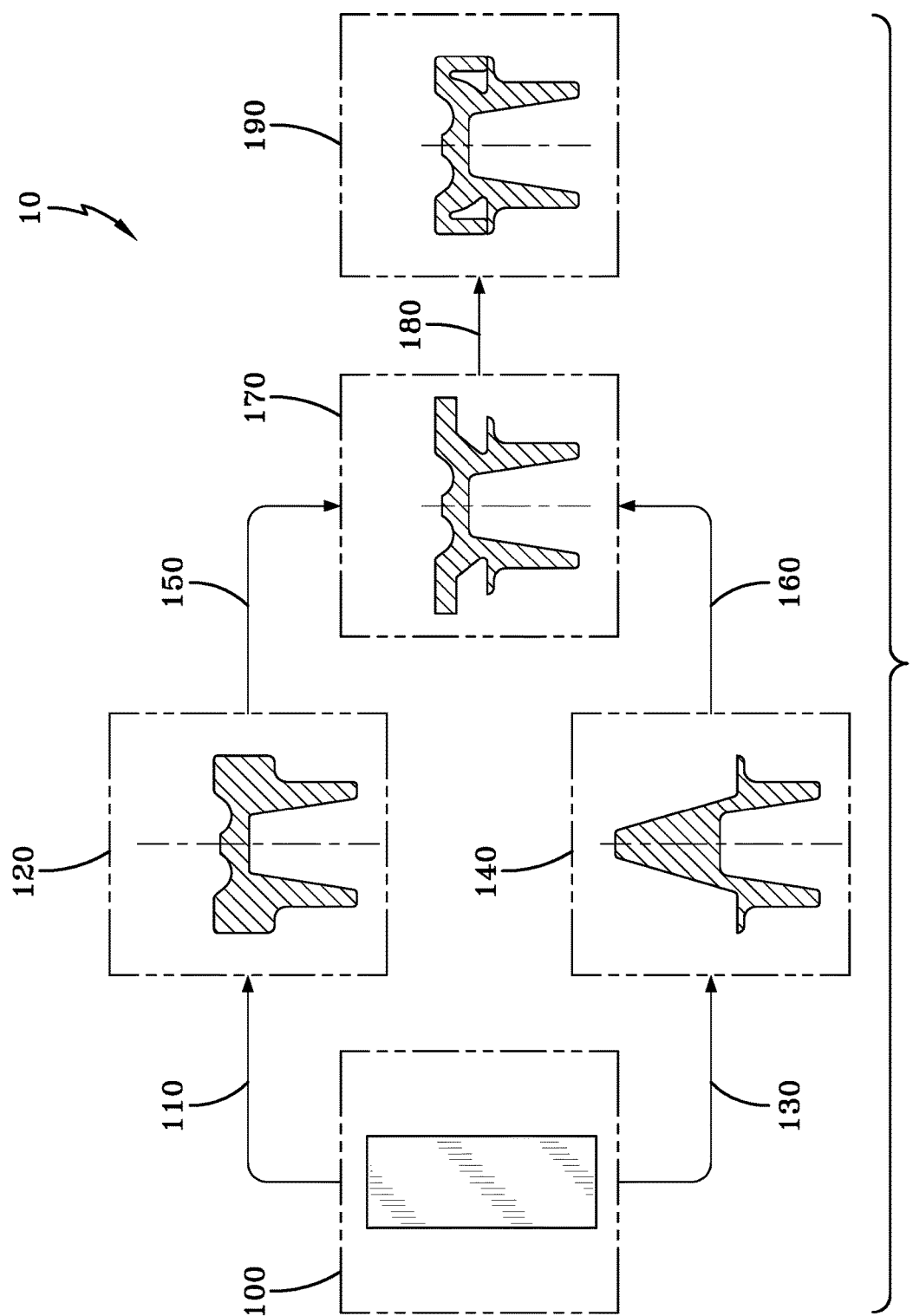
FIG. 1 is a flow diagram showing an exemplary method that embodies the inventive concept, where the method is practiced along a selected one of two alternate methods.

FIG. 1 shows in a diagrammatic manner, an embodiment 10 of the manufacturing scheme that incorporates the inventive concept. As will be disclosed, the scheme has an object of converting a billet of a selected metal into a finished piston while greatly reducing the amount of metal lost through machining processes. For example, U.S. Pat. No. 8,082,839, to Huang, teaches a method where a one-piece piston blank has a gallery precursor opened by machining. According to the inventor's investigations, the opening of the gallery precursor by machining inherently results in substantial metal loss, to the extent that a preform could lose up to 60% of its initial weight in the manufacturing of the final product piston. For example, one final piston weighed 4146 g, but to manufacture the piston, a preform weighing 8942 g was required, a 54% weight loss. In addition to the time and expense involved in machining, the inventor determined that the preform could be reduced in size by about 20% if the metal is moved instead of removed in forming the gallery precursor. At the weight cited above, this reduction amounts to over 1500 g. In many instances when a piston blank or preform is purchased, the price will be directly dependent upon the weight of the metal used.

In a method such as is taught by Huang, four basic steps were used. In a first step, a preform was forged from a steel billet. In a second step, the preform was then extensively machined to create the open gallery precursor around the periphery of the preform. The third step involved closing the gallery precursor by a spin bending technique in which a radially-extending flange, which is formed or at least extended above the open gallery by the machining step, is folded over the gallery. In the fourth step, further machining was again used to finish the piston. An example of a structure provided in this fourth step is the ring belt, which extends peripherally around the piston at the height of the gallery. In providing this simplified description of the process evaluated, it will be understood that further steps, such as welding the gallery, stress relieving and heat treating were also performed in providing the final product.

Redirecting now to FIG. 1, the inventor has determined two methods for achieving this goal. These will be described briefly and then in more detail. In the first of the two methods, laid out together as embodiment 10, a billet is provided, as shown in box 100. A representation of the billet, especially a cylindrical billet is shown in box 100. Under the known methods, the billet would be expected to have a starting mass that would be in the range of about 2 to about 2.5 times the mass of the product piston. If, however, the mass of the preform is reduced by 20% because machining of the gallery is eliminated by using metal movement, the billet can have a starting mass in the range of about 1.6 to about 2 times the mass of the product piston.

A hot forging process occurs at this point to the billet provided. Under a first method, steps along path 110 are followed, arriving at a piston preform of a first type, as depicted in box 120. Alternately, path 130 may be followed, in which case a differently configured piston preform is generated, as depicted in box 140. In either case, it would be typical, but not necessary, to form structures in the lower part of the piston preform that will later be finalized as the skirt and the piston pin boss of the product piston. However, and as will be explained, the alternate paths 110 and 130 arrive at piston preforms in which the crown portions of the preforms look distinctly different.

From this point of distinction, the two methods converge at a piston preform in which a radially-open gallery has been formed, with a flange positioned above the gallery and an undercut below it. Either path 150 or 160 shares the distinct property of forming the radially-open gallery without the use of machining, or expressed differently, without any significant weight loss in the piston preform. Either path 150, 160 arrives at box 170, where the piston preform with the gallery are depicted.

From box 170, known methods, designated by path 180 can be used to close the gallery by metal movement involving the flange, arriving at box 190, where the piston is essentially finished. Beyond box 190, and for the first time in either method, the piston is completed using techniques that involve metal loss due to machining. This final "cleanup" of the piston is well known in the art. It includes providing the piston with a ring belt around the periphery of the piston adjacent to the now-closed gallery, meeting the necessary tolerances and providing the final surface finishing.

Figure 2A:
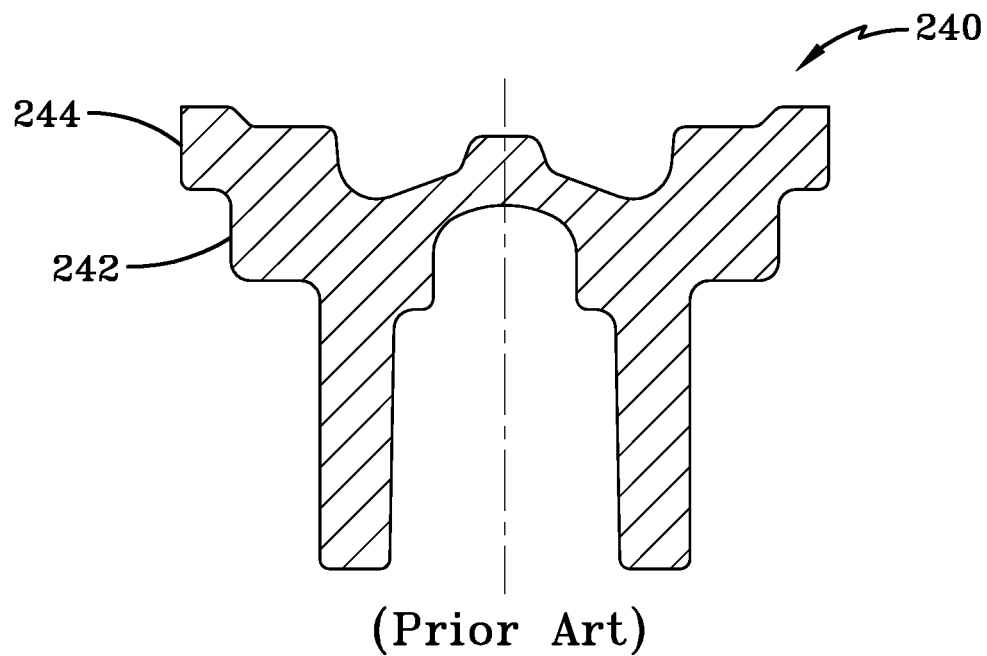
FIGS. 2A and 2B show side-sectional views through a preform according to the prior art and according to the inventive concept, respectively.

With that established, attention may be directed to the procedures practiced in moving along path 110 from box 100 to box 120. In this step, or, probably more correctly, steps, the cylindrical billet from box 100 is first heated to a suitable temperature for a hot forging process. This will vary upon the metal being used, but will be readily known or ascertainable to one of skill. In general, the actual hot forging process will also be very similar to that known in the art. In fact, the procedures for forming the skirt and the piston pin boss will be indistinguishable from those known in the prior art. However, significant differences will be seen in the upper portion of the preform, that is, in the areas destined to become the crown and the gallery. With this in mind, a typical cross-section of a preform using the current technology is shown in FIG. 2A, while a preform prepared under an embodiment of the inventive concept is shown in FIG. 2B.

Figure 2B:
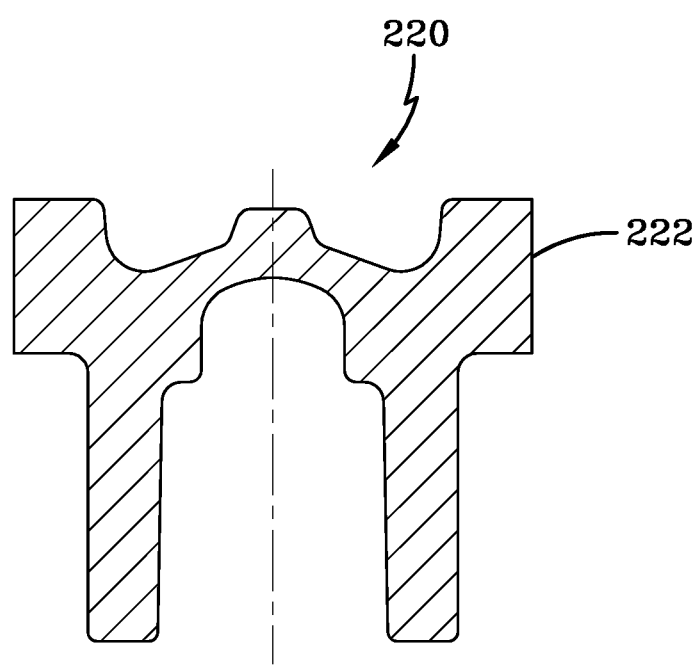

The preform 220 in FIG. 2B should be recognizable as the embodiment depicted in box 120 of FIG. 1. A preform 240 in FIG. 2A shows a prior art embodiment. Recall that the preform 220 starts with a cylindrical billet having a reduced mass, so the crown 222 has a reduced diameter from crown 242 and preform 220 has no equivalent to the flange 244 seen in the prior art embodiment 240.

Figure 3A:
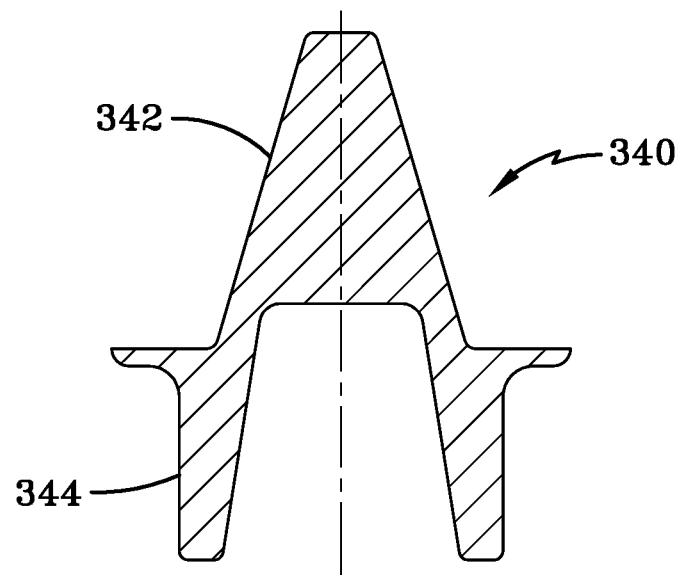
FIGS. 3A and 3B show side-sectional views through a preform according to one embodiment of the inventive concept, with FIG. 3B being an intermediate preform in producing the preform of FIG. 3A.
Figure 3B:
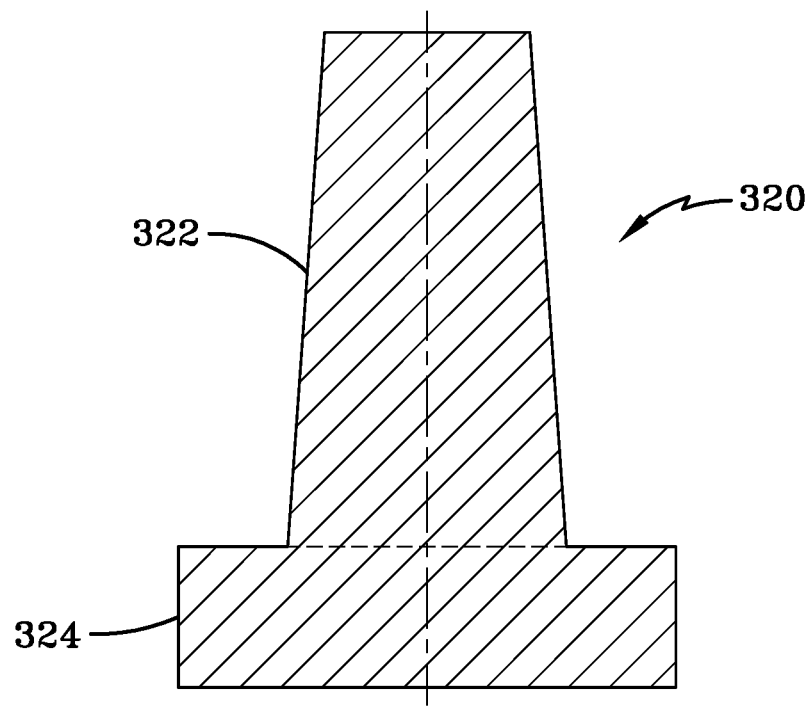

In a contrasting manner, the path 130 from box 100 to box 140 takes a distinctive turn from the known prior art techniques for forming a piston. In this approach, forward backward extrusion is used to prepare a preform 340 as shown in FIG. 3A, where material at the top of the billet is gathered into, preferably, a frustoconical top or spike 342. The lower portion of the billet is extruded into the underskirt 344, in this latter case practicing known art techniques. This extended cone or spike will be subjected to heating, preferably inductive heating, to establish a temperature gradient in the extended cone, with the hottest temperatures at the top end, so other shapes may be useful with this intention in mind. An intermediate product 320 that may be formed in going from the billet to the preform of FIG. 3A is shown in FIG. 3B, with a precursor 322 of the extended cone formed, but the underskirt not formed from its precursor 324. The figures are not drawn to scale. Inductive heating, while not necessary to the method, has been determined to be a rapid and effective method for the desired temperature gradient.

Figure 4:
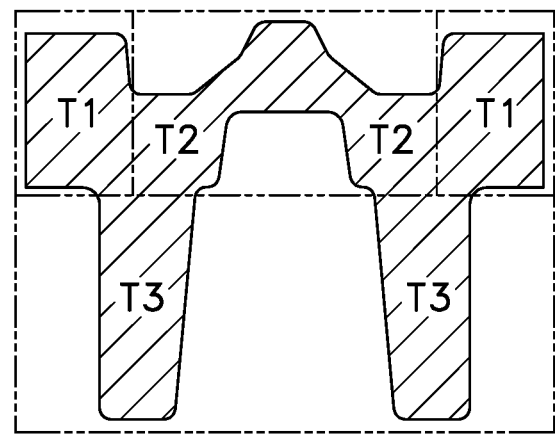
FIG. 4 shows a side-sectional view of a preform of FIG. 2B, showing temperature zones for inductive heating.
Figure 5A:
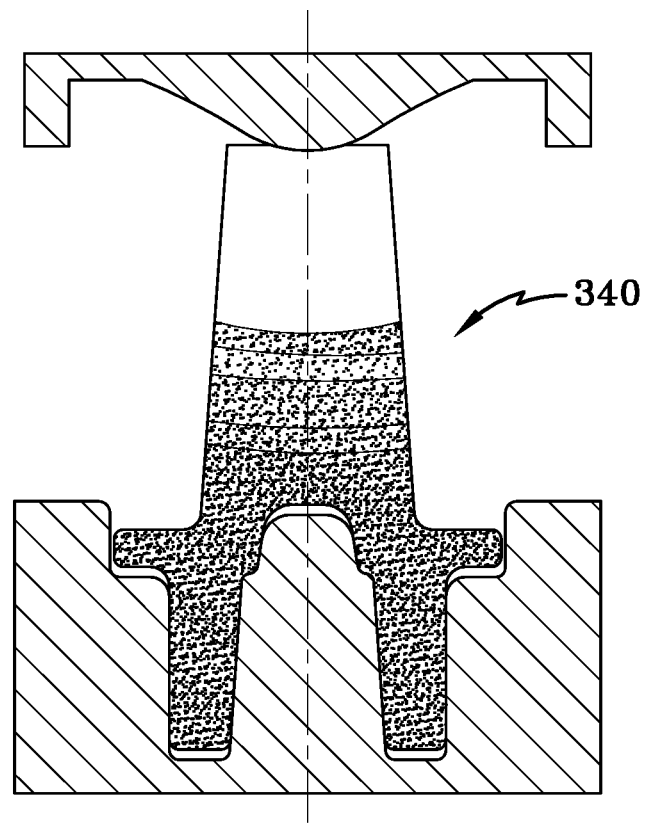
FIGS. 5A through 5D show in side-sectional views of the progressive upsetting of the preform of FIG. 3A into a pair of horizontal split dies.
Figure 5B:
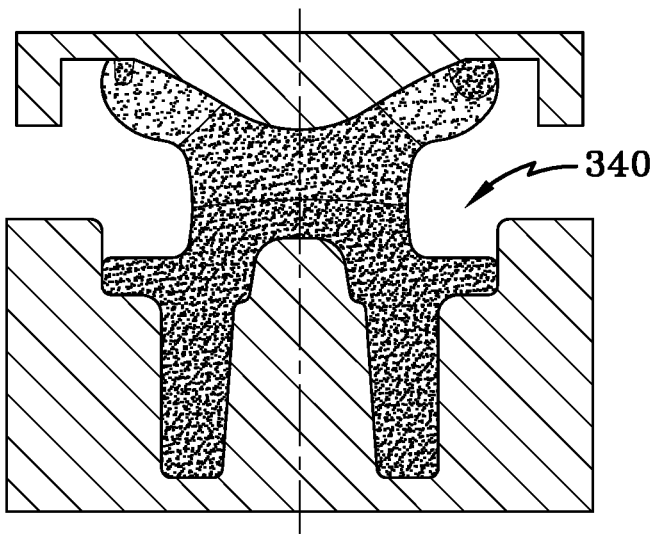
Figure 5C:
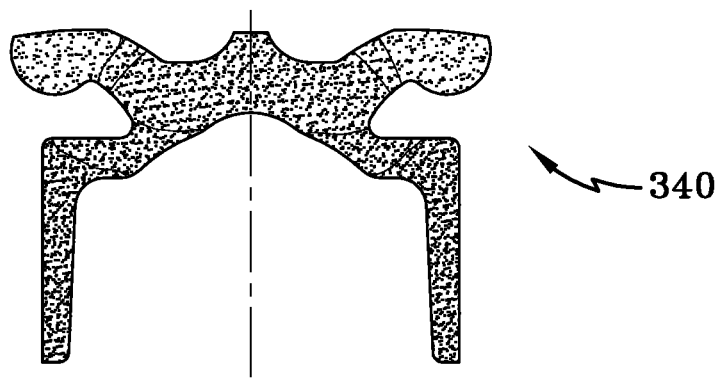
Figure 5D:
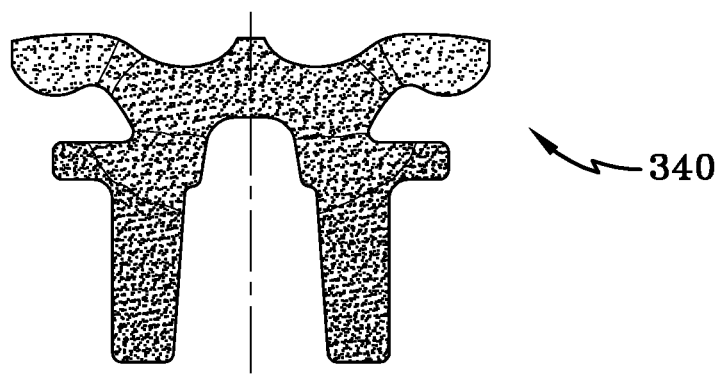

To move along path 150 from box 120 to box 170, a combination of induction heating and spin forming are used. The desired induction heating is achieved by selecting an induction coil suitable for heating the preform 220, as shown in FIG. 4, so that there are three separate temperature zones created. Of these, T1 is an upper, radially outward zone; T2 is an upper, radially-inward zone and T3 is a lower zone. Exemplary target temperature ranges for the spin forming that follows the induction heating would be for T1 to be in the range of 1150 to 1250 C, T2 to be in the range of 950 to 1150 C and for T3 to be less than 700 C. Experimentally, the spin forming was done using a VDM 400 machine, manufactured by WF Maschinenbau and Blechformtechnik GmbH. The device can mount three rollers around the workpiece, with a maximum load on the tail stock of 60 tonnes and a maximum spindle rate of 750 rpm. By using the spin forming machine, heated metal is displaced both radially and axially, resulting in the preform depicted in box 170. Thus, the "hot forming" that occurs along path 150 is a sequence of heating and spin forming.

It is also necessary to describe the operation along path 160 to move from box 140 to box 170. As with path 150, it is necessary to heat preform 340. Preferably, temperatures in the range of about 1100 C are achieved at the top end of the cone and the temperatures under 500 C are achieved in the lower skirt portion. A good thermal gradient in the axial direction assists in controlling material flow. By upsetting the cone or spike of the preform 340 on a set of horizontal split dies, as depicted in the sequence of FIGS. 5A through 5D, the flange, the open gallery and the undercut are formed. This process has been demonstrated to be possible at forging loads of 440 to 600 tonnes and press speeds of 300 mm/sec or lower. To properly split the spike or cone into the flange, low press speeds are very desirable.

As with the path 150, path 160 is a sequence of heating, preferably inductive heating, followed by a hot forming technique. In this case, the hot forming is upsetting the workpiece into a set of dies. Along both paths 150, 160, it is notable that the absence of machining allows the workpiece to be reshaped by metal movement and not by metal loss.

The concept of moving metal rather than removing metal continues on path 180, which leads from box 170 to box 190, where a semi-finished piston is obtained as the result. Using further selective heating, the flange is hot bent over the open gallery, closing the gallery. This technique is generally known in the prior art, where the radially-open gallery has been achieved by machining, for example in Huang '839. However, and as a point of distinction, the metal movement techniques used in the embodiments of the inventive concept may well provide a better preform profile for conducting the gallery closing, as the radial extent of the flange may be larger.

It is again noted that the closed-gallery preform depicted in box 190 is not a finished product and will need to be subjected to finishing processes, including machining, that will result in metal loss from the mass of the initial billet provided. However, no significant metal loss has occurred to this point, at which the final preparation of the finished piston will be well-known to those of skill in the art.

While the method herein has been described for manufacturing a steel piston for use in a heavy duty engine, the methods are capable of being adapted to other metals for other pistons or other devices. In fact, to the extent that a material may be more amenable to metal movement than to machining, the techniques of forming products such as a piston with a closed gallery may be able to produce products previously not deemed practical under the prior art.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method for forming a piston having a closed gallery, comprising the steps of:
   providing a billet of metal;
   hot forging the billet, producing a first piston preform having a skirt, a piston pin boss and a crown;
   hot forming the first piston preform by a combination of selectively heating and spin forming a crown portion of the first piston preform to generate a second piston preform having a flange and an undercut, separated axially by a gallery that is open in the radial direction, the gallery being opened up on the second piston preform without any loss of material;
   hot bending the flange over the open gallery, generating a third piston preform having a closed gallery; and machining the third piston preform having a closed gallery, generating a finished piston.

2. The method of claim 1, wherein:
in the machining step, at least a ring belt is formed by machining the third piston preform.

3. The method of claim 1, wherein:
the finished piston produced has a weight that is at least 50% of the weight of the billet provided.

4. The method of claim 1, wherein:
the billet provided is cylindrical.

5. The method of claim 4, wherein:
the finished piston produced has a weight that is up to about 62% of the weight of the cylindrical billet provided.

6. The method of claim 1, wherein:
substantially all of the difference in weight between the cylindrical billet provided and the finished piston occurs during the step of machining to obtain the finished piston.

7. The method of claim 1, wherein:
the billet provided comprises a steel alloy.

8. The method of claim 1, wherein:
at least one of the steps of hot forging, hot forming and hot bending includes induction heating to establish a temperature gradient.

9. The method of claim 8, wherein:
all heating required in the steps of hot forging, hot forming and hot bending are achieved using induction heating.

10. The method of claim 1, wherein:
all of the steps involved in converting the billet provided into the third piston preform having a closed gallery are achieved without using any machining of the billet or any intermediate preforms.

11. The method of clam 1, wherein a plurality of separate temperature zones are formed in the crown portion by the selective heating.

* * * * *